H. C. PRIEBE.
VEHICLE.
APPLICATION FILED JUNE 20, 1908.
1,066,146.
Patented July 1, 1913.
3 SHEETS—SHEET 2.
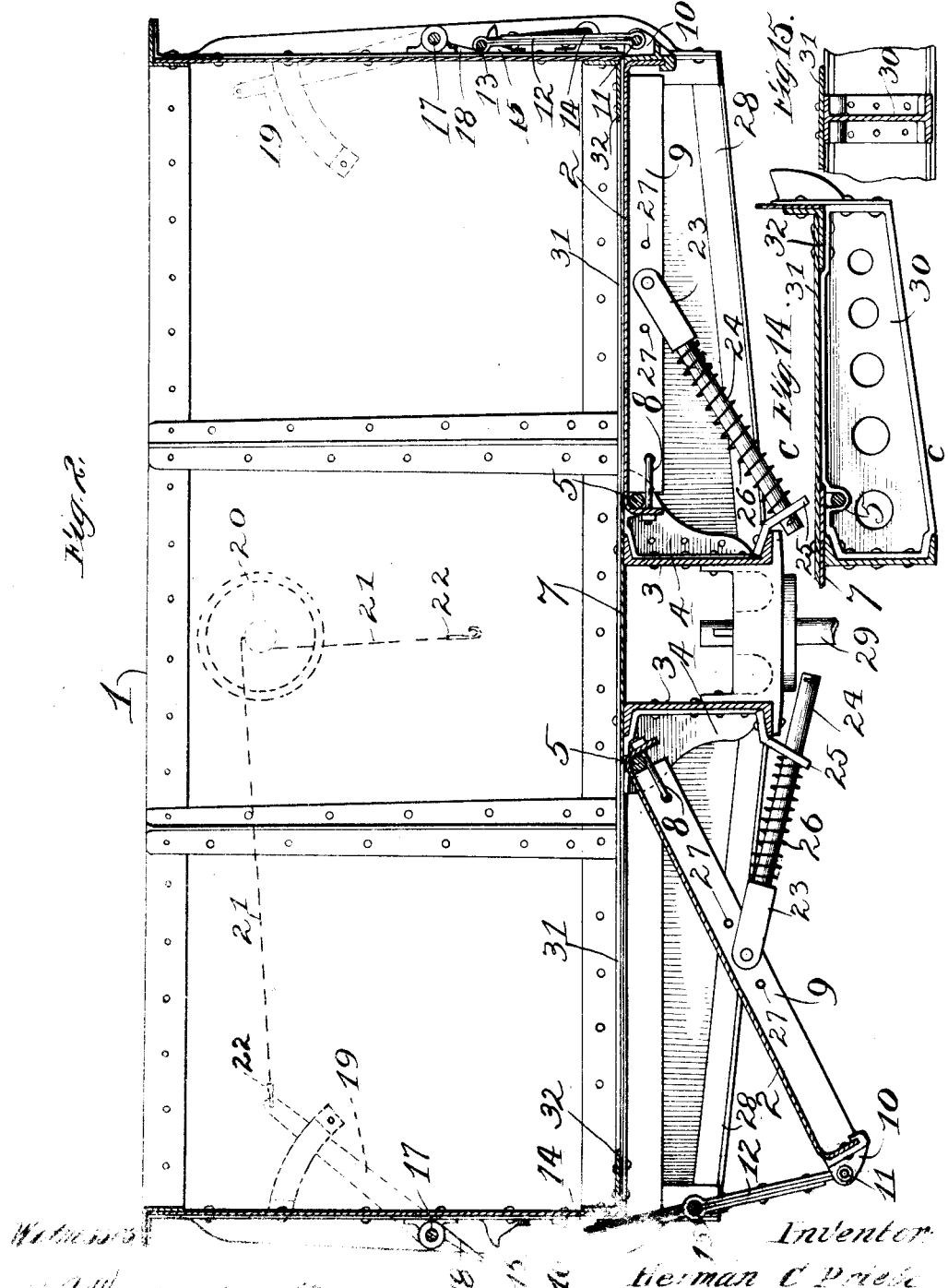

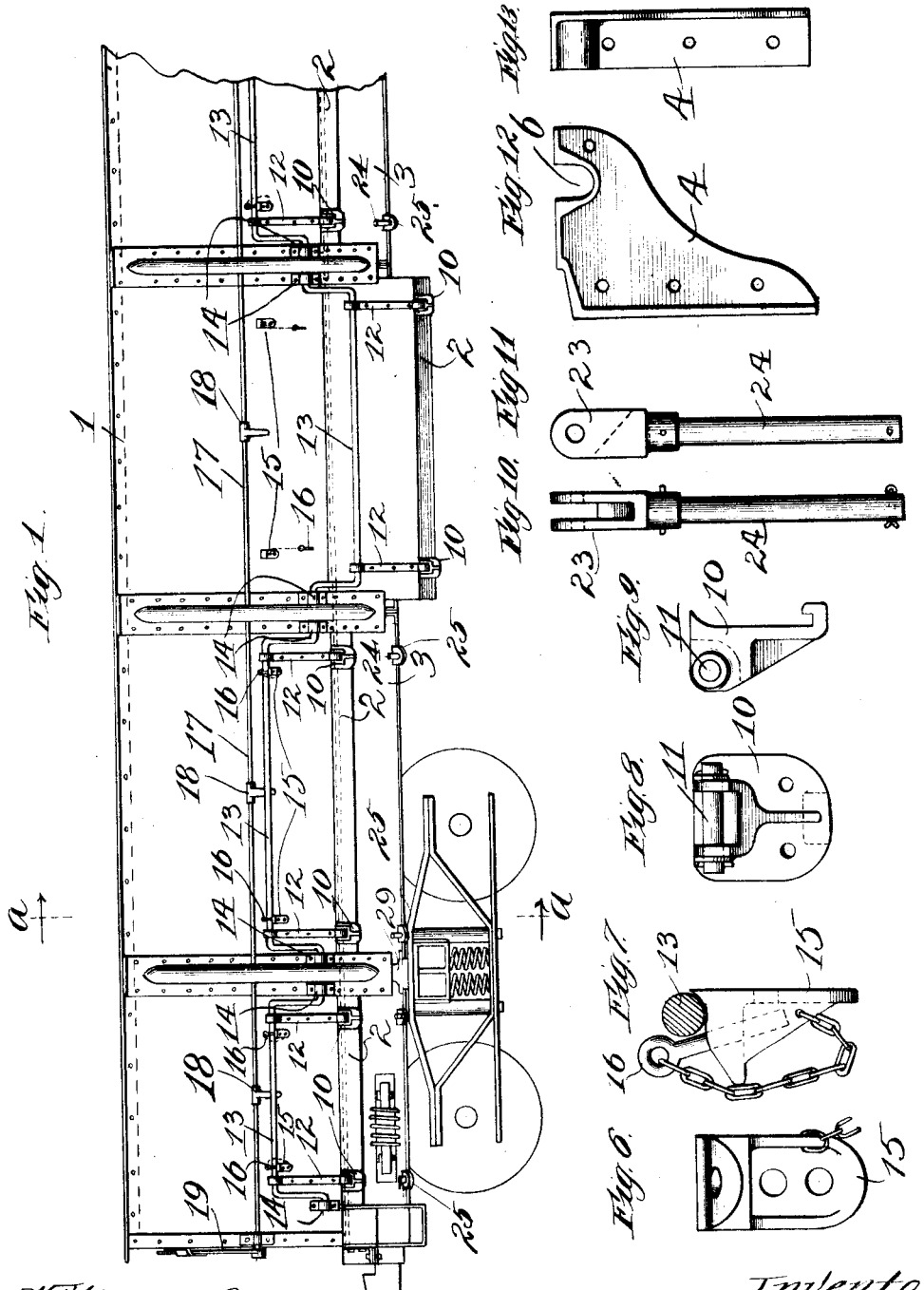

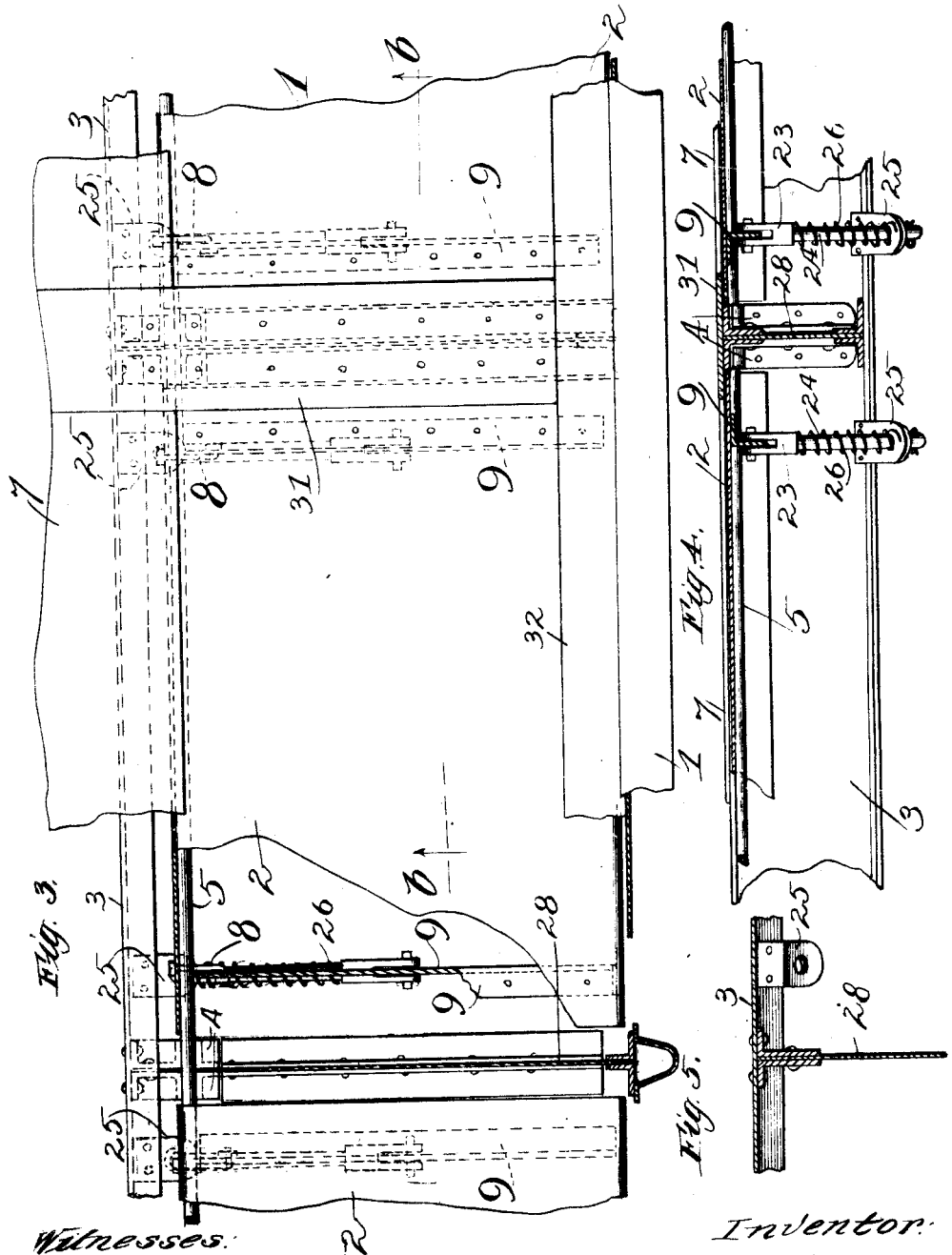

UNITED STATES PATENT OFFICE.

HERMAN C. PRIEBE, OF BLUE ISLAND, ILLINOIS.

VEHICLE.

1,066,146.   Specification of Letters Patent.   Patented July 1, 1913.

Application filed June 20, 1908. Serial No. 439,509.

*To all whom it may concern:*

Be it known that I, HERMAN C. PRIEBE, citizen of the United States, residing at Blue Island, in the county of Cook and State of Illinois, have invented a certain new and useful Improvement in Vehicles, of which the following is a full, clear, concise, and exact description, reference being had to the accompanying drawings, forming a part of this specification.

My invention relates to vehicles in which swinging floor sections are provided, whereby the vehicle contents may readily be discharged.

The invention finds its most wide application in connection with railway dump cars, though I do not wish to be limited to this application of my invention in all embodiments thereof.

Inasmuch as the invention finds its most general application to railway vehicles, I will describe one embodiment thereof by reference to a railway vehicle constructed in accordance therewith.

A section of the vehicle or car floor is mounted to tilt or swing, the swinging section being desirably hinged to the center sills of a car and being desirably connected at its outer and free end with suitable operating mechanism, whereby the said floor section may be permitted to descend, the load that is to be discharged forcing the descent of the swinging floor section against the influence of mechanism which I employ for restoring the floor section to its normal level position when the load has been discharged. The mechanism which I employ for restoring the floor section to its normal position after the load has been discharged, is automatic in its operation and desirably includes springs which are placed under compression, or in which power may otherwise be stored when the load causes the floor section associated therewith to descend, the load storing the power in the springs, which, when the load has been discharged, is sufficient, when the mechanism is in normal condition, to effect the complete elevation of the floor section.

My invention also has other objects in view, among which is the provision of improved mechanism for effecting the release of the floor section to permit the load to lower the floor section and be discharged therefrom, and the provision of mechanism whereby a number of floor sections may be simultaneously released while permitting each of such groups of floor sections to be individually released, if desired.

My invention also has for its object the provision of an improved hinge structure whereby the floor sections may be swingingly mounted upon the car.

Other features and advantages of my invention will appear in connection with the accompanying drawings, showing the preferred embodiment of the invention, and the specific description that will be given of said drawings.

In the drawings Figure 1 is a side elevation of a part of a gondola car constructed in accordance with one embodiment of the invention, some of the structural details of the car being omitted, as they are not essential to an understanding of the invention. Fig. 2 is a view in cross-section on line *a a* of Fig. 1, a right-hand floor section being shown in an elevated position, while a left-hand floor section is shown in a depressed position. Fig. 3 is a plan view of so much of the car illustrated in Figs. 1 and 2 as will render more clear the illustration in Figs. 1 and 2, the parts being broken away in Fig. 3 to render more clear certain details of construction. Fig. 4 is a sectional view on line *b b* of Fig. 3. Fig. 5 is a sectional plan view showing the structure contiguous to the center sills and one of the elements of the mechanism that automatically effects the closing movement of a floor section. Fig. 6 is a face view of a part of the mechanism that is employed to insure the maintenance of a floor section in a closed position. Fig. 7 is a side view of the structure shown in Fig. 6, there being added a pin which coöperates with the device shown in Fig. 7, Fig. 7 also showing a portion of the mechanism that is employed to maintain a floor section in closed position. Fig. 8 is a face view of a fitting provided upon a free longitudinal or outer edge of a swinging floor section and which enters into the construction that is employed for maintaining a floor section in a closed position. Fig. 9 is a side view of the structure shown in Fig. 8. Fig. 10 is a top view of an element of the automatically operating mechanism that is employed to effect a closing movement of a floor section. Fig. 11 is a side elevation of the structure shown in Fig. 10. Fig. 12 is a side elevation of a fitting that is attached to a center sill and which enters into the construction in my improved hinge support for a swinging floor section. Fig. 13 is a face view of the structure shown in Fig. 12. Fig. 14 is a side elevation, partially in section, showing a portion of my improved structure that enters into the hinge formation that is provided for a floor section. Fig. 15 is a sectional view on line c c of Fig. 14.

Like parts are indicated by similar characters of reference throughout the different figures.

In accordance with American practice, I have shown a gondola car 1 which is of considerable length, as is well known, on which account the floor is subdivided into a plurality of swinging sections 2, a number of these sections being disposed upon each side of the car, though I do not wish to be limited in all embodiments of my invention to a plurality of floor sections. The inner end of each floor section is hinged to a center sill, there being illustrated two center sills 3 3, each of which is provided with hinge pintle-supporting blocks 4 4 that project laterally from the center sills and form a part of the means whereby the swinging sections are hinged to the center sills. Pintle rods 5 5 are provided in association with each center sill 3 and are received within cavities 6 (Fig. 12) in the pintle-supporting blocks 4. The floor sections are preferably made of sheet metal and are deflected downwardly at their inner and outer ends, the inner marginal side portions of the floor sections thus formed coöperating with the top portions of the floor sections to constitute a seat for the pintle rod 5 which finds lodgment in the corners formed of the top and inner side portions of the floor sections. The downturned marginal portions of the sheet metal forming the swinging floor sections serve to counteract the end thrusts that might be imposed upon the floor sections by sudden impact. The hinge as thus constructed is of simple design and is effective in operation, but to insure against dislodgment of the floor sections at their hinges, I preferably adopt the precautionary features of construction now to be described. One of these precautionary features of construction resides in a floor plate 7 spanning the gap between the center sills 3 and projecting laterally of the car sufficiently upon each side of the center sills as to overlie the pintle rods 5, the sheet metal of the floor sections being interposed between the said pintle rods and the floor sections 7, whereby the hinged ends of the floor sections may not readily be elevated and thereby disengaged.

It will be apparent from the drawings that the floor sections normally have restricted ranges of movement, so that normally the floor plate 7 will be sufficient to guard against the unhinging of the floor sections 2. Furthermore, the sections 7, by thus projecting over the pintle rods 5, make the bottom of the car tight, to prevent leakage of the load at the hinges. However, in case of accident, the floor sections may drop beyond their normal ranges of movement, in which case the floor section 7 might not be sufficient to guard against the unhinging of the floor sections 2, and I, therefore, provide bolts 8 which underlie the pintle rods 5 and pass through the inner side downwardly projecting margins of the floor sections and through cleats 9 that are secured to and beneath the floor sections. In hinging the doors, the bolts 8 are out of position, the doors being engaged with the pintle rods 5 while said doors are in vertical positions, the bolts 8 being located in place when the pintle rods 5 engage the corner sheets that have been described.

I will now describe the mechanism that is employed for maintaining the swinging floor sections in closed positions, and will thereafter describe the automatically operating mechanism that enters into service when the load is discharged to exert closing action upon said floor sections, though I do not wish to be limited in all embodiments of my invention to the precise form of mechanism that is employed for maintaining the swinging floor sections in their closed positions.

Upon the outside marginal portions of each floor section, I provide the attachments 10 illustrated most clearly in Figs. 8 and 9, there being desirably two such attachments to each floor section, one near each transverse edge of each floor section. The attachments 10 include short pintles or shafts 11 about which are journaled the lower ends of links 12 that are in the nature of pitman connections, the upper ends of the pitman connections 12 being journaled upon the eccentric portions or rods 13 of cranks that are journaled to rotate at 14.

By reference particularly to Fig. 2, it will be observed that when a floor section is in a closed position, the crank element 13 lies closer to the car body than does the journal 14 for the crank mechanism, while the connection at 11 is included in a line with the element 13 that is interposed between the axis of rotation at 14 and the side of the car, so that there is no tendency for the crank element 13 to work outwardly; but, on the other hand, there is a tendency for the said shaft element 13 to press against the side of the car, and a load upon the associate floor section actually forces the element 13 against the side of the car so that said floor section is maintained in a closed position. However, in order to guard against accidents, I provide supplemental means for normally preventing the crank elements 13 from moving away from the sides of the car, which supplemental means is shown most clearly in Figs. 6 and 7, where I have shown attachments 15 secured upon the sides of the car and provided with pockets or recesses for receiving locking pins 16 chained to the blocks 15, the crank elements 13 being received between the locking pins 16 and the sides of the car, whereby the crank elements 13 are positively prevented from moving outwardly. The blocks 15 are desirably so constructed that they take part in supporting the swinging floor sections, the construction being such that the crank elements 13 snugly engage the blocks 15. The journals 14 and the blocks 15 thus share between them the performance of the function of maintaining the outer ends of the swinging floor sections elevated.

By reference more particularly to Fig. 1, it will be observed that each floor section is provided with the crank mechanism 13 14 and the link mechanism 12, which is independent of such mechanism provided in association with each other swinging floor section, whereby each floor section may be lowered independently of each other floor section. When it is desired to lower less than the complete number of floor sections upon one side of the car, the locking pins 16 are withdrawn, whereupon a slight bar thrust exerted outwardly against the crank elements 13 will place said crank elements 13 sufficiently away from the sides of the car as to permit the load carried by the swinging floor sections to cause the descent of said floor sections. The provision of a plurality of swinging floor sections in combination with means whereby the floor sections may be lowered independently of each other, is quite important and highly useful for many reasons which will be apparent to those skilled in the art. For example, when it is desired to pull an engine or to load a wagon, but one floor section need be lowered.

It is often desirable to cause all of the swinging floor sections upon each side of the car to be lowered simultaneously, to which end I employ rotating shafts 17 upon each side of the car and extending lengthwise thereof, this shaft 17 being provided with fingers 18 whose outer ends are adapted to engage the crank elements 13 when said crank elements lie close to the car sides. When it is desired simultaneously to lower all of the swinging floor sections upon a side of the car, the shaft 17 is rotated, the locking pin 16 having previously been removed, whereby all of the crank elements 13 upon said side of the car are moved sufficiently away from the car to permit the portion of the load carried upon the corresponding swinging floor sections to cause said floor sections to descend.

I desirably provide an operating handle 19 in fixed relation with the rod 17, whereby said rod 17 may be turned for the purpose stated. While I have hitherto stated that the rods 17 extend throughout the length of the car, I do not wish to be limited to this characteristic.

It is frequently desirable simultaneously to lower the swinging floor sections upon each side of the car, to which end I employ a windlass 20, about whose shaft chains 21 may be wound, the free ends of these chains carrying hooks 22 which may be engaged with the upper ends of the handles 19, whereby as the windlass 20 is wound, the handles 19 may be rotated, thereby to effect the outward movement of the fingers 18, and, consequently, secure a sufficient outward movement of the crank portions 13 to permit the load carried by the swinging floor sections to effect the descent of said floor sections.

I will now describe the mechanism which may be employed automatically to effect closing movement of a swinging floor section after the load portion carried thereby has been discharged therefrom. In the embodiment of the invention illustrated, I have provided cleats 9 extending transversely of the car and secured to and projecting downwardly from the bottoms of the floor sections. There are desirably two such cleats to each floor section and each cleat is desirably constructed of angle iron, as indicated most clearly in Fig. 3. The bifurcated end 23 of a rod or piston 24 is pivoted between the ends of each cleat 9, the other end of each rod 24 projecting through a portion 25, which, in effect, constitutes a continuation of the contiguous center sill 3, as in the embodiment of the invention illustrated the portions 25 are shown separately formed and riveted to the center sills 3. Each rod piston 24 is surrounded by a spring 26 that is interposed between the enlarged bifurcated end 23 and the associate portion 25 which constitutes a spring seat. When a load portion effects the depression of a swinging floor section, the spring 26 is placed under sufficient compression so that when said load portion has been fully discharged, the spring 26 will expand and exert a closing action upon the associate swinging floor section. The spring 26 is thrust upon by the floor section when the floor section is being opened and thrusts upon the floor section when exerting closing action thereupon. It will be observed that the bifurcated end 23 of the rod 24 is pivotally connected with the associate cleat 9, a pin passing through the end 23 and the associate cleat 9 for this purpose.

In order to adjust the spring, I provide means whereby the point of attachment of an end 23 with the associate cleat 9 may be changed, to which end there may be provided a plurality of holes 27 distributed along the length of the cleat, whereby the point of anchorage of the end 23 may be shifted toward or from the associate pintle rod 5, thereby to secure the desired spring adjustment.

In Fig. 2 I have shown a part of the needle beams or cross bars 28 and a center bearing 29 simply for the purpose of rendering more complete an understanding of one embodiment of my invention. In the construction of Fig. 2 the elements 4 and 28 are indicated as being separately formed. In Figs. 14 and 15 the elements 4 and 28 are merged into a single integral structure 30. A needle beam is interposed between each pair of contiguous transverse edges of adjacent swinging floor sections. Floor strips 31 are secured to the top portions of the needle beams, each floor strip extending substantially entirely across the width of the car and being carried upon and fastened to the tops of the needle beams. The swinging floor sections underlie the floor strips 31, and snugly fit the same when said swinging floor sections are closed, so that the load may not leak out between said floor strips and the floor sections. The outer side borders of the car bottom are provided with insetting plates 32 which also are snugly engaged by the swinging floor section when closed, to prevent leakage along the sides of the car bodies. The transverse strips 31 desirably terminate at the marginal strips 32, as indicated in Figs. 1 to 13, inclusive, though in Fig. 14 the transverse strip 31 is projected over the marginal strips 32.

It will be seen that I have provided a vehicle having a swinging floor section 2, a hinge by which said section is swingingly mounted, said hinge including a pintle rod 5 carried by the vehicle body, while said floor section is provided with an angular extension where said floor section is hinged, said pintle rod being received in the corner constituted of this angular extension and the main portion of the floor section, the pintle rod underlying the floor section, a retaining bolt 8 passing through said angular extension, the pintle rod being located between said retaining bolt and the load-supporting portion of the floor section, and a retaining element 7 overlying the pintle, a portion of the swinging floor section being interposed between said element 7 and the pintle rod.

It will be seen that I have provided a vehicle having a swinging floor section, crank mechanism journaled upon the vehicle, and link mechanism having connection with the swinging floor section and with the crank mechanism. The link mechanism and the crank mechanism are so interrelated with the swinging floor section and the contiguous side of the vehicle that the line of pull of the link mechanism upon the crank mechanism when the swinging floor section is closed lies between the axis of rotation of the crank mechanism upon the vehicle and the contiguous vehicle side, or in other words, it lies farther upon that side of the crank mechanism which is adjacent to the vehicle body than it does upon the opposite side of said crank mechanism, whereby the load carried by the swinging floor section exerts pressure upon the link mechanism where it is joined with the crank mechanism toward the vehicle rather than away from the vehicle, there thus being no tendency on the part of the floor section and its load to operate the crank mechanism to permit the floor section to be opened, the reverse tendency being present.

While I have herein shown and particularly described the preferred embodiment of my invention, I do not wish to be limited to the precise construction shown, as changes may readily be made without departing from the spirit of my invention, but,

Having thus described my invention, I claim as new and desire to secure by Letters Patent the following:—

1. A vehicle having a swinging floor section, a hinge by which said section is swingingly mounted, said hinge including a pintle rod carried by the vehicle body, while said floor section is provided with an angular extension where said floor section is hinged, said pintle rod being received in the corner constituted of this angular extension and the main portion of the floor section, and a retaining bolt passing through said angular extension and a separated portion of the floor section, the pintle rod being located between said retaining bolt and the load-supporting portion of the floor section.

2. A vehicle having a swinging floor section, a hinge by which said section is swingingly mounted, said hinge including a pintle rod carried by the vehicle body, while said floor section is provided with an angular extension where said floor section is hinged, said pintle rod being received in the corner constituted of this angular extension and the main portion of the floor section, the pintle rod underlying the floor section, and a retaining bolt passing through said angular extension and a separated portion of the floor section, the pintle rod being located between said retaining bolt and the load-supporting portion of the floor section.

3. A vehicle having a swinging floor section, a hinge by which said section is swingingly mounted, said hinge including a pintle rod carried by the vehicle body, while said floor section is provided with an angular extension where said floor section is hinged, said pintle rod being received in the corner constituted of this angular extension and the main portion of the floor section, and a retaining element 7 overlying the pintle, a portion of the swinging floor section being interposed between said element 7 and the pintle rod.

4. A vehicle having a swinging floor section, a hinge by which said section is swingingly mounted, said hinge including a pintle rod carried by the vehicle body, while said floor section is provided with an angular extension where said floor section is hinged, said pintle rod being received in the corner constituted of this angular extension and the main portion of the floor section, the pintle rod underlying the floor section, and a retaining element 7 overlying the pintle, a portion of the swinging floor section being interposed between said element 7 and the pintle rod.

5. A vehicle having a swinging floor section, a hinge by which said section is swingingly mounted, said hinge including a pintle rod carried by the vehicle body, while said floor section is provided with an angular extension where said floor section is hinged, said pintle rod being received in the corner constituted of this angular extension and the main portion of the floor section, a retaining bolt passing through said angular extension and a separated portion of the floor section, the pintle rod being located between said retaining bolt and the load-supporting portion of the floor section, and a retaining element 7 overlying the pintle, a portion of the swinging floor section being interposed between said element 7 and the pintle rod.

6. A vehicle having a swinging floor section, a hinge by which said section is swingingly mounted, said hinge including a pintle rod carried by the vehicle body, while said floor section is provided with an angular extension where said floor section is hinged, said pintle rod being received in the corner constituted of this angular extension and the main portion of the floor section, the pintle rod underlying the floor section, a retaining bolt passing through said angular extension and a separated portion of the floor section, the pintle rod being located between said retaining bolt and the load-supporting portion of the floor section, and a retaining element 7 overlying the pintle, a portion of the swinging floor section being interposed between said element 7 and the pintle rod.

7. A vehicle having a swinging floor section, and mechanism against the force of which said floor section is lowered by the load portion carried by the floor section and serving to exert closing action upon the floor section, said mechanism including a rod 24 linked to the floor section and guided by an element 25 provided upon the vehicle body, a spring 26 being seated upon said element 25 and adapted for compression against the said element as the floor section is being lowered.

8. A vehicle having a swinging floor section, crank mechanism journaled upon the vehicle, link mechanism 12 intervening between the crank mechanism and the swinging floor section, a block carried by the vehicle body, and a pin 16 insertible within said block for engaging the crank mechanism and thereby insuring the retention of the swinging floor section in an elevated position.

9. A vehicle having a swinging floor section, crank mechanism journaled upon the vehicle, link mechanism 12 intervening between the crank mechanism and the swinging floor section, the portion of the link mechanism 12 connected with the crank mechanism being adapted to lie closer to the vehicle side than the axial mounting for said crank mechanism, a block carried by the vehicle body, and a pin 16 insertible within said block for engaging the crank mechanism and thereby insuring the retention of the swinging floor section in an elevated position.

10. A vehicle having a swinging floor section, crank mechanism journaled upon the vehicle, link mechanism 12 intervening between the crank mechanism and the swinging floor section, and mechanism adapted when operated to move outwardly against the crank mechanism to permit the load portion carried by the swinging floor section to effect the descent of said floor section.

11. A vehicle having a swinging floor section, crank mechanism journaled upon the vehicle, link mechanism 12 intervening between the crank mechanism and the swinging floor section, the portion of the link mechanism 12 connected with the crank mechanism being adapted to lie closer to the vehicle side than the axial mounting for said crank mechanism, and mechanism adapted when operated to move outwardly against the crank mechanism to permit the load portion carried by the swinging floor section to effect the descent of said floor section.

12. A vehicle having a swinging floor section, crank mechanism journaled upon the vehicle, link mechanism 12 intervening between the crank mechanism and the swinging floor section, a block carried by the vehicle box, a pin 16 insertible within said block for engaging the crank mechanism and thereby insuring the retention of the swinging floor section in an elevated position, and mechanism adapted when operated to move outwardly against the crank mechanism to permit the load portion carried by the swinging floor section to effect the descent of said floor section.

13. A vehicle having a swinging floor section, crank mechanism journaled upon the vehicle, link mechanism 12 intervening between the crank mechanism and the swinging floor section, the portion of the link mechanism 12 connected with the crank mechanism being adapted to lie closer to the vehicle side than the axial mounting for said crank mechanism, a block carried by the vehicle body, a pin 16 insertible within said block for engaging the crank mechanism and thereby insuring the retention of the swinging floor section in an elevated position, and mechanism adapted when operated to move outwardly against the crank mechanism to permit the load portion carried by the swinging floor section to effect the descent of said floor section.

14. A vehicle having a swinging floor section upon each side thereof, mechanisms for maintaining the floor sections in closed positions, devices having handles for adjusting said mechanisms to permit the load portions to cause said floor sections to descend, and a windlass adapted to be coupled with the handles of said devices to effect their simultaneous operation, whereby both floor sections may be lowered by the load portions they carry.

15. A vehicle having a swinging floor section, and mechanism against the force of which said floor section acts in being opened and serving to exert closing action upon the floor section, said mechanism including a rod 24 linked to the floor section and guided by an element 25 provided upon the vehicle body, a spring 26 being seated upon said element 25 and adapted for compression against the said element as the floor section is being lowered.

16. A car of the class described provided with drop bottom sections, a shaft upon which each of said sections swings, toggle joints limiting the downward movement of said sections, supporting members, pistons secured to the door sections and extending through said supporting members, compression springs surrounding said pistons, and means for opening and closing said door sections.

17. A car of the class described having drop bottom sections upon each side thereof, shafts beneath the floor of the car upon which the sections swing, a pair of toggle joints connected with the opening edge of each section and with the car, a lever for opening and closing said doors, supporting members, pistons secured to said doors and extending through said supporting members, and compression springs surrounding the pistons against which said sections open.

18. A car provided with a plurality of drop bottom sections upon each side of the longitudinal center thereof, each of said sections adapted to open downwardly, toggle joints connecting the opening edge of each section with the car, pistons secured to the rear of each drop bottom section, compression springs surrounding each of said pistons, the tension of said springs adapted to be exerted against the drop bottom sections in moving them to closed position.

19. A car provided with a plurality of drop bottom sections upon each side of the longitudinal center thereof, a crank rod extending parallel with the side of the car above each of said sections, arms pivotally connected with the opening edge of each section and forming toggle joints with the aforesaid crank rod, means for turning said rod to open and closed position, and latches adapted to engage with said rod when the sections are in closed position.

20. A car provided with a plurality of drop bottom sections extending parallel with the longitudinal center of the car, a shaft upon which each of said sections swings, pistons and compression springs near the inner edge of said sections, crank rods extending parallel with the sides of the car, arms connected with the opening edge of each of said sections and forming toggle joints with the aforesaid crank rods, brackets secured to the side of the car in line with the aforesaid rod when the sections are in closed position, and latches taking over said rod and adapted to engage the rod when the sections are closed.

21. A car provided with a plurality of drop bottom sections extending parallel with the longitudinal center of the car, a shaft upon which said sections are mounted at their inner edge, a crank rod extending parallel with the side of the car, arms connecting with the opening edge of each section and forming toggle joints with the aforesaid crank arm, latches secured to the side of the car, and means for locking said rod against the side of the car when the sections are in closed position.

22. In a drop bottom door for cars, the combination of the car frame and body, a shaft extending parallel with the length of the car, a door frame having recesses therein which fit over said shaft, a piston rod pivotally secured to the door, a compression spring upon said piston, and means for swinging said door upon the aforesaid shaft.

23. In a car, the combination of a plurality of drop bottom sections, each of said sections hinged to the car floor and adapted to swing downwardly, crank shafts extending longitudinally of the car upon each side thereof, and crank arms secured to said shaft and to the free ends of said hinged sections, means for operating said shaft to open and close the doors, and compression springs operated by the downward movement of the door sections.

In witness whereof, I hereunto subscribe my name this 18th day of June A. D., 1908.

HERMAN C. PRIEBE.

Witnesses:
L. G. STROH.
G. L. CRAGG.